United States Patent
Xu et al.

(10) Patent No.: US 10,954,402 B2
(45) Date of Patent: Mar. 23, 2021

(54) INKJET INK COMPOSITIONS

(71) Applicant: Cabot Corporation, Boston, MA (US)

(72) Inventors: Jinqi Xu, Westford, MA (US); Jodi A. Bates, Chelmsford, MA (US); Heather E. Clarke, Lancaster, MA (US); Tianqi Liu, Boxborough, MA (US); Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 16/123,384

(22) Filed: Sep. 6, 2018

(65) Prior Publication Data
US 2019/0071580 A1  Mar. 7, 2019

Related U.S. Application Data

(60) Provisional application No. 62/555,267, filed on Sep. 7, 2017.

(51) Int. Cl.
| | |
|---|---|
| *C09D 11/102* | (2014.01) |
| *C09D 11/326* | (2014.01) |
| *C09D 11/322* | (2014.01) |
| *C09D 11/00* | (2014.01) |
| *C09D 11/30* | (2014.01) |
| C08G 18/76 | (2006.01) |
| C08G 18/48 | (2006.01) |
| C08G 18/73 | (2006.01) |
| C08L 75/08 | (2006.01) |

(52) U.S. Cl.
CPC .......... *C09D 11/326* (2013.01); *C09D 11/00* (2013.01); *C09D 11/102* (2013.01); *C09D 11/30* (2013.01); *C09D 11/322* (2013.01); C08G 18/4845 (2013.01); C08G 18/73 (2013.01); C08G 18/7621 (2013.01); C08L 75/08 (2013.01)

(58) Field of Classification Search
CPC ... C09D 11/102; C09D 11/322; C09D 11/326; C08G 18/4845
See application file for complete search history.

(56) References Cited

U.S. PATENT DOCUMENTS

| | | | |
|---|---|---|---|
| 7,176,248 B2 | 2/2007 | Valentini et al. | |
| 7,348,368 B2 | 3/2008 | Kakiuchi et al. | |
| 7,462,679 B1 | 12/2008 | Xiao | |
| 7,922,805 B2 * | 4/2011 | Kowalski | C09B 67/0007 106/31.6 |
| 9,056,991 B2 | 6/2015 | Clarke | |
| 9,109,128 B2 | 8/2015 | Xu et al. | |
| 9,169,413 B2 | 10/2015 | Shiiba et al. | |
| 9,243,155 B2 | 1/2016 | Okamura et al. | |
| 9,920,209 B2 * | 3/2018 | Liu | C09D 11/38 |
| 2007/0100024 A1 | 5/2007 | Gu et al. | |
| 2012/0154481 A1 | 6/2012 | Nishino et al. | |
| 2013/0210999 A1 * | 8/2013 | Xu | C09D 11/102 524/591 |

OTHER PUBLICATIONS

International Search Report and Written Opinion of the International Searching Authority for International Patent Application No. PCT/US2018/049657, dated Nov. 28, 2018. (10 pages).

\* cited by examiner

*Primary Examiner* — Vu A Nguyen

(57) ABSTRACT

Disclosed herein are inkjet ink compositions comprising: at least one pigment and at least one polyurethane comprising: at least one polypropylene glycol, and at least one diisocyanate. The at least one polyurethane contains at least 70 wt % polypropylene glycol relative to the at least one polyurethane and has a weight average molecular weight ($M_w$) of no more than 80,000.

30 Claims, No Drawings

INKJET INK COMPOSITIONS

FIELD OF THE INVENTION

Disclosed herein are inkjet ink compositions comprising pigments and polymeric dispersions, such as polyurethane dispersions.

BACKGROUND

Inkjet ink compositions typically contain a liquid vehicle, which functions as a carrier, and a colorant such as a dye or pigment. Additives and/or cosolvents can also be incorporated to adjust the inkjet ink to attain desired overall performance properties. Polymers have also been incorporated in inkjet ink compositions as dispersants to improve dispersibility of a pigment in liquid media, or to improve performance. For example, emulsion polymers or latexes have been used as an additive to improve the print performance of inkjet inks. However, as emulsion polymers, these polymers are not soluble in certain liquid media, which may lead to difficulties in printing, e.g., nozzle clogging. Accordingly, there remains a need for inkjet ink compositions and systems with improved print properties, such as improved print durability and reliability.

DETAILED DESCRIPTION

Disclosed herein are inkjet ink compositions comprising:
at least one pigment; and
at least one polyurethane comprising:
at least one polypropylene glycol, and
at least one diisocyanate,
wherein the at least one polyurethane contains at least 70 wt % polypropylene glycol relative to the at least one polyurethane, and wherein the at least one polyurethane has a weight average molecular weight ($M_w$) of no more than 80,000.

In one embodiment, "polyurethane" refers to a polymer containing organic moieties joined by urethane linkages, e.g., —NH—C(O)—O—. In one embodiment, the at least one polyurethane can further comprise other types of linkages, such as urea linkages (e.g., —NH—C(O)—NH—), in addition to the urethane linkages. In another embodiment, the at least one polyurethane consists essentially of urethane and ether linkages.

In one embodiment, the number average molecular weight of the at least one polypropylene glycol ranges from 400 g/mol to 6,000 g/mol, e.g., from 700 g/mol to 6,000 g/mol, from 1000 g/mol to 6,000 g/mol, from 400 g/mol to 5,000 g/mol, from 700 g/mol to 5,000 g/mol, from 1000 g/mol to 5,000 g/mol, from 400 g/mol to 4,000 g/mol, from 700 g/mol to 4,000 g/mol, or from 1000 g/mol to 4,000 g/mol. Molecular weights of the at least one polypropylene glycol can be determined by an end group analysis.

In one embodiment, the at least one polypropylene glycol is present in an amount of at least 70% by weight, or at least 75% by weight relative to the at least one polyurethane, e.g., from 70% to 90%, from 70% to 89%, from 70% to 88%, from 70% to 87%, from 70% to 86%, from 71% to 90%, from 71% to 89%, from 71% to 88%, from 71% to 87%, from 71% to 86%, from 72% to 90%, from 72% to 89%, from 72% to 88%, from 72% to 87%, from 72% to 86%, from 73% to 90%, from 73% to 89%, from 73% to 88%, from 73% to 87%, from 73% to 86%, from 74% to 90%, from 74% to 89%, from 74% to 88%, from 74% to 87%, from 74% to 86%, from 75% to 90%, from 75% to 89%, from 75% to 88%, from 75% to 87%, or from 75% to 86%, by weight relative to the at least one polyurethane.

In one embodiment, the at least one diisocyanate has the formula (I):

$$\text{OCN—R}_1\text{—NCO} \quad (I)$$

wherein $R_1$ can be substituted or unsubstituted and is selected from $C_1$-$C_{10}$ alkylene, $C_3$-$C_{20}$ cycloalkylene, $C_3$-$C_{20}$ heterocycloalkylene (at least one ring atom being a heteroatom selected from O, N, and S), $C_5$-$C_{20}$ arylene, $C_3$-$C_{20}$ heteroarylene (at least one ring atom being a heteroatom selected from O, N, and S), and combinations thereof. In one embodiment, $R_1$ is unsubstituted. In one embodiment, $R_1$ is substituted with at least one substituent selected from $C_1$-$C_{10}$ alkyl and $C_5$-$C_{20}$ aryl groups. For example, $R_1$ can be hexamethylene or phenylene optionally substituted with methyl, or cyclohexylene optionally substituted with methyl,

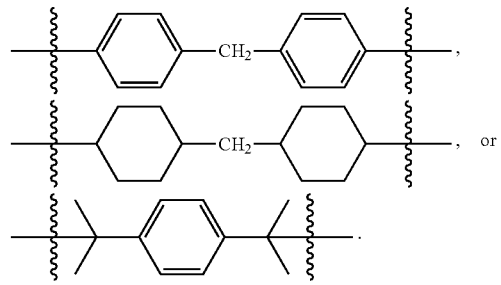

In one embodiment, the at least one diisocyanate is selected from toluene diisocyanates such as toluene 2,4-diisocyanate (2,4-TDI) and toluene 2,6-diisocyanate (2,6-TDI), hexamethylene diisocyanate (HDI), 4,4'-methylene diphenyl diisocyanate (4,4'-MDI), 2,4'-methylene diphenyl diisocyanate (2,4'-MDI), 2,2'-methylene diphenyl diisocyanate (2,2'-MDI), methylene bis(4-cyclohexyl diisocyanate) (HDMI), m-tetramethylxylene diisocyanate (m-TMXDI), and isophorone diisocyanate (IPDI). In one embodiment, the diisocyanate is selected from toluene diisocyanates (e.g., toluene 2,4-diisocyanate, toluene 2,6-diisocyanate), isophorone diisocyanate, and combinations thereof.

In one embodiment, the at least one diisocyanate is present in an amount ranging from 3% to 29% by weight, relative to the at least one polyurethane, e.g., from 5% to 29%, from 10% to 29%, from 3% to 25%, from 5% to 25%, from 3% to 20%, from 5% to 20%, from 3% to 15%, or from 5% to 15% by weight, relative to the at least one polyurethane.

In one embodiment, in addition to the at least one polypropylene glycol and the at least one diisocyanate, the at least one polyurethane further comprises a monomer containing at least one hydrophilic group. In one embodiment, a "hydrophilic group" is capable of hydrogen bonding with water. In one embodiment, the at least one hydrophilic group is selected from hydroxyls, carboxylic acids, sulfonic acids, phosphonic acids, polyethers (e.g., a polyethylene glycol, polypropylene glycol, etc.), and salts and ethers thereof. In one embodiment, the at least one hydrophilic group is selected from carboxylic acids, and salts and ethers thereof. In one embodiment, the monomer containing at least one hydrophilic group has the formula (II):

$$\text{—O—R}_2\text{—O—} \quad (II)$$

wherein $R_2$ comprises the at least one hydrophilic group bonded to a moiety, which can be substituted or unsubstituted, selected from $C_1$-$C_{10}$ alkylene, $C_3$-$C_{20}$ cycloalkylene, $C_3$-$C_{20}$ heterocycloalkylene (at least one ring atom being a heteroatom selected from O, N, and S), $C_5$-$C_{20}$ arylene, $C_3$-$C_{20}$ heteroarylene (at least one ring atom being a heteroatom selected from 0, N, and S), $C_6$-$C_{20}$ alkylarylene. In one embodiment, the moiety is unsubstituted. In another embodiment, the moiety is substituted with at least one substituent selected from $C_1$-$C_{10}$ alkyl and $C_5$-$C_{20}$ aryl groups. In one embodiment, the monomer containing at least one hydrophilic group is dimethylolpropionic acid (DMPA).

In one embodiment, the molar ratio between the at least one diisocyanate and the sum of the polypropylene glycol and the monomer containing at least one hydrophilic group (if the latter is present) can range from 0.5:1 to 3:1.

In one embodiment, the at least one polyurethane is characterized by an NCO/OH ratio, which is the ratio of the molar amount of isocyanate groups/molar amount of the hydroxyl groups from all diol monomers, e.g., the at least one polypropylene glycol alone, or if present, the sum of the at least one polypropylene glycol and the monomer containing at least one hydrophilic group. In one embodiment, the NCO/OH ratio ranges from 0.85 to 1.15, e.g., from 0.85 to 1.1, from 0.9 to 1.15, from 0.9 to 1.1, from 0.95 to 1.15, from 0.95 to 1.1, from 1 to 1.15, or from 1 to 1.1.

In one embodiment, the at least one polyurethane has an acid number corresponding to the amount of monomer containing at least one hydrophilic group, e.g., a carboxylic acid group, or any hydrophilic group disclosed herein. For example, the acid number (AN) of the at least one polyurethane can be calculated from the following equation:

AN=(no. mol of monomer containing hydrophilic group×56.1 mgKOH×1000)/(the total mass (g) of monomers In one embodiment, the at least one polyurethane has an acid number ranging from 10 to 50 mg KOH/g polyurethane, e.g., ranging from 10 to 40 mg KOH/g polyurethane, from 10 to 35, from 15 to 50, from 15 to 40, from 15 to 35, from 20 to 50, from 20 to 40, from 20 to 35, from 25 to 50, from 25 to 40, or from 25 to 35 mg KOH/g polyurethane.

In one embodiment, the at least one polyurethane has a weight average molecular weight ($M_w$) of no more than 80,000. In another embodiment, the at least one polyurethane has a weight average molecular weight ranging from 10,000 g/mol to 80,000 g/mol, e.g., a weight average molecular weight ranging from 20,000 g/mol to 80,000 g/mol, from 30,000 g/mol to 80,000 g/mol, from 40,000 g/mol to 80,000 g/mol, or from 50,000 g/mol to 80,000 g/mol. Without wishing to be bound by theory, it is believed that, if the weight average molecular weight of the polyurethane is too large, the jetting capability of the ink composition containing such a polyurethane could be reduced.

The at least one polyurethane can be made by methods known in the art, such as polycondensation reactions. The preparation can involve multi-step synthetic processes. In one embodiment, the method involves forming an NCO-terminated prepolymer (i.e., isocyanate-terminated prepolymer), wherein the forming comprises reacting a diol monomer with a diisocyanate. In one embodiment, the diol monomer can comprise the polypropylene glycol and/or the monomer containing at least one hydrophilic group (e.g., the diol is dimethylolpropionic acid). In one embodiment, the forming of the prepolymer can occur in the absence of solvent or in the presence of a water-miscible organic solvent that does not react with an isocyanate group, such as acetone or N-methylpyrrolidone (NMP). In one embodiment, the forming of the prepolymer can occur at room temperature or at an elevated temperature (e.g., at least about 50° C.) and/or in the presence of a catalyst (e.g., dibutyl tin dilaurate). The reaction time can range from 5 minutes to 24 hours, depending on factors such as reaction temperature, monomer concentration, reactivity of the monomers, and the presence or absence of a catalyst.

In one embodiment, the NCO-terminated prepolymer can be further chain extended and/or end capped to form polyurethane dispersions, e.g., aqueous polyurethane dispersions. Exemplary chain extenders are polyamine chain extenders, which can optionally be partially or wholly blocked, and include those described in U.S. Pat. Nos. 4,269,748 and 4,829,122, the disclosures of which are incorporated by reference herein. In one embodiment, aqueous polyurethane dispersions are prepared by mixing the NCO-terminated prepolymer with at least partially blocked, diamine or hydrazine chain extenders in the absence of water, followed by combining the mixture with water. Upon contact with water, the blocking agent can be released and the resulting unblocked polyamine can react with the isocyanate prepolymer to form the polyurethane. The polyamines can be aromatic, aliphatic or alicyclic amines and may contain from 1 to 30 carbon atoms, e.g., from 2 to 15 or from 2 to 10 carbon atoms. These polyamines may contain additional substituents provided that they are not as reactive with isocyanate groups as the primary or secondary amines.

Exemplary polyamines include 1-amino-3-aminomethyl-3,5,5-trimethylcyclohexane (isophorone diamine or IPDA), bis-(4-amino-cyclohexyl)-methane, bis-(4-amino-3-methyl-cyclohexyl)-methane, 1,6-diaminohexane, ethylene diamine, diethylene triamine, triethylene tetramine, tetraethylene pentamine and pentaethylene hexamine. Hydrazine may also be used. The chain extender may also further comprise an ionic group, particularly an anionic group, such as a carboxylic acid group. Thus, the chain extender may be a diamine having at least one carboxylic acid group, including, for example, H2N—CH2CH2-NH—CH2CH2-COOH. Any isocyanate groups that are not chain extended with an amine will react with water, which functions as a diamine chain extender. Also, chain extension can take place prior to addition of water in the process, but typically takes place by combining the isocyanate prepolymer, chain extender, water and other optional components under agitation.

The NCO-terminated prepolymer can also be end capped in the presence of an end-capping agent. Such end-capping agents can be mono-amine, mono-alcohol, or combinations thereof. Isocyanate groups that are not reacted with an end-capping reagent can react with water, which can function as a chain extender by extending the chain of the prepolymer.

In one embodiment, when a monomer containing at least one hydrophilic group is included in the formation of the at least one polyurethane wherein the at least one hydrophilic group is an acidic group, neutralizing agents can be used to convert the acid groups to salts. Such neutralizing agents can include tertiary amines, alkali metal hydroxyl, and ammonia. Exemplary cations formed by this neutralization reaction include $Li^+$, $Na^+$, $K^+$, $Cs^+$, and $[N(R)_4]^+$, in which each R can be independently selected from H, $C_1$-$C_{10}$ alkyl, and $C_5$-$C_{20}$ aryl. Neutralization can be performed at any suitable point during the preparation of the polyurethane, e.g., either before, during, or after the chain extension reaction of the NCO-terminated prepolymer.

Another embodiment provides polyurethane dispersions. The dispersions can be aqueous. In one embodiment, the aqueous solution contains greater than 50% by weight water and can be, for example, water or mixtures of water with water miscible solvents such as alcohols.

Another embodiment provides inkjet ink compositions comprising the polyurethane dispersions disclosed herein. In one embodiment, the at least one polyurethane is present in the inkjet ink composition in an amount ranging from 0.1% to 15%, e.g., from 0.2% to 15%, from 0.5% to 15%, from 1% to 15%, from 2% to 15%, from 3% to 15%, from 0.1% to 10%, from 0.2% to 10%, from 0.5% to 10%, from 1% to 10%, from 2% to 10%, from 0.1% to 5%, from 0.2% to 5%, from 0.5% to 5%, or from 1% to 5%, from 2% to 5%, from 0.1% to 1.5%, from 0.2% to 1.5%, or from 0.2% to 1% by weight relative to the total weight of the ink composition.

In one embodiment, the composition can include a pigment, which can be unmodified or modified. The amount of pigment used in the inkjet ink composition can be varied but is typically in an amount effective to provide the desired image quality (for example, optical density) without detrimentally affecting the performance of the inkjet ink. In one embodiment, the pigment is present in the inkjet ink composition in an amount ranging from 0.1% to 20%, e.g., from 1% to 20%, from 1% to 10%, or from 3% to 8%, based on the total weight of the inkjet ink composition.

The relative amounts of the at least one polyurethane and the modified pigment can be varied. In one embodiment, the modified pigment and the at least one polyurethane is present in a weight ratio ranging from 15/1 to 1/3, e.g., from 15/1 to 1/2, from 15/1 to 1/1, from 10/1 to 1/3, from 10/1 to 1/2, from 10/1 to 1/1, from 5/1 to 2/1, from 4/1 to 2/1, or from 3/1 to 2/1.

Examples of suitable pigments include blue pigments, black pigments (e.g., carbon black), brown pigments, cyan pigments, green pigments, white pigments, violet pigments, magenta pigments, red pigments, yellow pigments, orange pigments, or mixtures thereof. Examples of black pigments include various carbon blacks (e.g., Pigment Black 7) such as channel blacks, furnace blacks, gas blacks, and lamp blacks. Commercially available black pigments include, for example, carbon blacks sold under as REGAL, BLACK PEARLS, ELFTEX, MONARCH, MOGUL, and VULCAN trademarks available from Cabot Corporation (such as BLACK PEARLS 2000, BLACK PEARLS 1400, BLACK PEARLS 1300, BLACK PEARLS 1100, BLACK PEARLS 1000, BLACK PEARLS 900, BLACK PEARLS 880, BLACK PEARLS 800, BLACK PEARLS 700, BLACK PEARLS 570, BLACK PEARLS L, ELFTEX 8, MONARCH 1400, MONARCH 1300, MONARCH 1100, MONARCH 1000, MONARCH 900, MONARCH 880, MONARCH 800, MONARCH 700, REGAL 660, MOGUL L, REGAL 330, REGAL 400, VULCAN P). Carbon blacks available from other suppliers can also be used. In another embodiment, the pigment is selected from carbon blacks as described in U.S. Pat. No. 9,388,300, the disclosure of which is incorporated by reference. In one embodiment, the carbon black has an OAN 170 mL/100 g (e.g., from 170 to 220 mL/100 g), and at least one or more properties selected from STSA ranging from 160 to 220 $m^2/g$, a crushed OAN (COAN) of at least 120 mL/100 g (or at least 130 mL/100 g), a ratio of STSA/BET surface area ranging from 0.7 to 1 (or from 0.8 to 1, or from 0.9 to 1), and a BET surface area ranging from 190 to 275 $m^2/g$ (or from 200 to 275 $m^2/g$, from 200 to 270 $m^2/g$, or from 200 to 260 $m^2/g$).

Suitable classes of organic pigments include, for example, anthraquinones, phthalocyanine blues, phthalocyanine greens, diazos, monoazos, pyranthrones, perylenes, heterocyclic yellows, quinacridones, and (thio)indigoids. Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyrathrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellow include Pigment Yellow 117 and Pigment Yellow 138. Other suitable examples of pigments include Pigment Yellow 1, 74, 155, 180, 185, 213, 218, 220, and 221, Pigment Red 254, and 269, and Pigment Blue 16 and 60. Examples of other suitable colored pigments are described, for example, in Colour Index, 3rd edition (The Society of Dyers and Colourist, 1982).

In one embodiment, the pigment is a self-dispersed pigment, e.g., the pigment is self-dispersible. In one embodiment, the self-dispersed pigment is a modified pigment having at least one attached organic group. In one embodiment, an "attached" organic group can be distinguished from an adsorbed group in that a soxhlet extraction for several hours (e.g., at least 4, 6, 8, 12, or 24 hours) will not remove the attached group from the pigment. In another embodiment, the organic group is attached to the pigment if the organic group cannot be removed after repeated washing (e.g., 2, 3, 4, 5, or more washings) with a solvent or solvent mixture that can dissolve the starting organic treating material but cannot disperse the treated pigment. In yet another embodiment, "attached" refers to a bond such as a covalent bond, e.g., a pigment bonded or covalently bonded to the organic group.

The organic group may be an aliphatic group, a cyclic organic group, or an organic compound having an aliphatic portion and a cyclic portion. In one embodiment, the organic group is attached via a diazonium salt derived from a primary amine capable of forming, even transiently, a diazonium salt. Other methods of attachment are described below. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl), and heteroaryl groups (imidazolyl, pyrazolyl, pyridinyl, thienyl, thiazolyl, furyl, indolyl, and triazolyl, such as 1,2,4-triazolyl and 1,2,3-triazolyl).

In one embodiment, the at least one attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{2-}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —COO$^-$, —SO$_3^-$, —OSO$_3^-$, —HPO$_3^-$; —OPO$_3^{2-}$, or —PO$_3^{2-}$, and specific examples of an anionizable group can include —COOH, —SO$_3$H, —PO$_3$H$_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —NR'$_2$H$^+$, where R' represent an organic group, such as a substituted or unsubstituted aryl or alkyl groups. Organic ionic groups include those described in U.S. Pat. No. 5,698,016, the disclosure of which is incorporated herein by reference.

In one embodiment, the at least one attached organic group comprises a group selected from carboxylic acids, sulfonic acids, phosphonic acids, hydroxyls, amines, and esters, amides, and salts thereof. For example, the attached group may be an organic group such as a benzene carboxylic acid group (—C$_6$H$_4$—COOH group), a benzene dicarboxylic acid group, a benzene tricarboxylic acid group, a benzene sulfonic acid group (a —C$_6$H$_4$—SO$_3$H group), or salts thereof. In one embodiment, surface modification to introduce ionic or ionizable groups onto a pigment surface, such as chlorination and sulfonylation, may also be used. In one embodiment, the attached group is selected from a benzene carboxylic acid group (—C$_6$H$_4$—COOH group), a benzene dicarboxylic acid group, a benzene tricarboxylic acid group and the pigment is selected from carbon blacks as described in U.S. Pat. No. 9,388,300 (and as described herein), the disclosure of which is incorporated by reference.

In one embodiment, the organic group can be attached either directly (bonding to a native atom of the pigment) or indirectly via an intermediary or spacer group. In one embodiment, the intermediary or spacer group is selected from substituted and unsubstituted C$_1$-C$_{12}$ alkyl, C$_5$-C$_{20}$ aryl, C$_6$-C$_{24}$ alkyaryl and aralkyl, wherein "alkyl" can be optionally interrupted by a group containing a heteroatom selected from N, O, and S, and "aryl" includes ring carbon atoms optionally replaced by a group containing a heteroatom selected from N, O, and S. Typically, the attached group resides at the pigment surface.

The organic group can be substituted or unsubstituted. In one embodiment, the organic group is substituted with at least one functional group selected from esters, amides, ethers, carboxyls, aryls, alkyls, halides, sulfonates, sulfates, phosphonates, phosphates, carboxylates, OR", COR", CO$_2$R", OCOR", CN, NR"$_2$, SO$_2$, CO, SO$_3$, SO$_3$H, OSO$_2$, OSO$_3$, SO$_3$NR", R"NSO$_2$, NR"(COR"), NR"CO, CONR"$_2$, NO$_2$, NO$_3$, CONR", NR"CO$_2$, O$_2$CNR", NR"CONR", S, NR", SO$_2$C$_2$H$_4$, arylene as defined above, alkylene as defined above, wherein R", which can be the same or different, represents an organic group such as hydrogen, aryl, and alkyl, as defined herein.

Further examples of representative organic groups are described in U.S. Pat. Nos. 5,571,311; 5,630,868; 5,707,432; 5,955,232; 5,922,118; 5,900,029; 5,895,522; 5,885,335; 5,851,280; 5,837,045; 5,713,988; and 5,803,959; PCT Publication No. WO 96/18688; and PCT Publication No. WO 96/18690, the disclosures of which are incorporated herein by reference.

In one embodiment, the organic group contains a 5-membered heteroaromatic group comprising at least two ring heteroatoms, such as those disclosed in PCT Pub. No. WO 2011/143533, the disclosure of which is incorporated herein by reference. For example, the organic group can have formula (Ib) or (IIb):

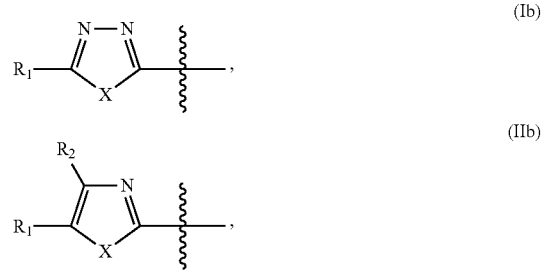

For Ib, X can be O, N(R$_a$), or S; and R$_1$ can be H, C$_1$-C$_{10}$ alkyl, C$_2$-C$_{10}$ alkenyl, C$_2$-C$_{10}$ alkynyl, C$_3$-C$_{20}$ cycloalkyl, C$_3$-C$_{20}$ cycloalkenyl, C$_1$-C$_{20}$ heterocycloalkyl, C$_1$-C$_{20}$ heterocycloalkenyl, aryl, heteroaryl, halo, cyano, OR$_b$, COOR$_b$, OC(O)R$_b$, C(O)R$_b$, C(O)NR$_b$R$_c$, SO$_3$R$_c$, NR$_b$R$_c$, or N$^+$(R$_b$R$_c$R$_d$)Y, in which each of R$_a$, R$_b$, R$_c$, and R$_d$, independently, can be H, C$_1$-C$_{10}$ alkyl, C$_3$-C$_{20}$ cycloalkyl, C$_1$-C$_{20}$ heterocycloalkyl, aryl, or heteroaryl and Y can be an anion. In general, Y can be any suitable anion, such as chloride, bromide, iodide, sulfate, nitrate, phosphate, citrate, methanesulfonate, trifluoroacetate, acetate, malate, tosylate, tartrate, fumarate, glutamate, glucuronate, lactate, glutarate, or maleate. For IIb, X is O, N(R$_a$), or S; and each of R$_1$ and R$_2$, independently, is H, C$_1$-C$_{10}$ alkyl, C$_2$-C$_{10}$ alkenyl, C$_2$-C$_{10}$ alkynyl, C$_3$-C$_{20}$ cycloalkyl, C$_3$-C$_{20}$ cycloalkenyl, C$_1$-C$_{20}$ heterocycloalkyl, C$_1$-C$_{20}$ heterocycloalkenyl, aryl, heteroaryl, halo, cyano, OR$_b$, COOR$_b$, OC(O)R$_b$, C(O)R$_b$, C(O)NR$_b$R$_c$, SO$_3$R$_c$, NR$_b$R$_c$, or N$^+$(R$_b$R$_c$R$_d$)Y, each of R$_a$, R$_b$, R$_c$, and R$_d$, independently, being H, C$_1$-C$_{10}$ alkyl, C$_3$-C$_{20}$ cycloalkyl, C$_1$-C$_{20}$ heterocycloalkyl, aryl, or heteroaryl and Y being an anion; provided that at least one of R$_1$ and R$_2$ is not H.

In one embodiment, the at least one organic group comprises the formula —[R(A)]-, wherein:

R is attached to the pigment and is selected from arylene, heteroarylene, and alkylene, and A is selected from carboxylic acids, sulfonic acids, phosphonic acids, hydroxyls, amines, and esters, amides, and salts thereof.

In another embodiment, the at least one organic group comprises the formula —[R(A)]-, wherein:

R is attached to the pigment and is selected from arylene, heteroarylene, and alkylene, and A is selected from hydrogen, alkyls, aryls, heteroaryls, alkylene oxides (e.g., ethylene or propylene oxide), carboxylic acid esters, and glycols.

In another embodiment, the at least one organic group comprises the formula —[R(A)]-, wherein:

R is attached to the pigment and is selected from arylene, heteroarylene, and alkylene, and A is selected from polymers.

The arylene, heteroarylene, and alkylene can be unsubstituted or substituted, e.g., with one or more of the functional groups listed above. Exemplary arylenes include phenylene, naphthylene, and biphenylene, and exemplary heteroarylenes include phenylene, naphthylene, and biphenylene having a ring carbon substituted with one or more oxygen or nitrogen atoms. In one embodiment, the arylene is a $C_5$-$C_{20}$ arylene. Heteroarylenes can be an arylene as defined herein which one or more ring carbon atoms is replaced with a heteroatom, e.g., N, O, and S. The heteroatom can be bonded to other groups in addition to being a ring atom. Exemplary arylenes include phenyl, naphthyl, anthracenyl, phenanthrenyl, biphenyl, and exemplary heteroarylenes include pyridinyl, imidazolyl, pyrazolyl, thienyl, thiazolyl, furyl, triazinyl, indolyl, benzothiadiazolyl, and benzothiazolyl. Alkylenes may be branched or unbranched. The alkylene may be a $C_1$-$C_{12}$ alkylene such as methylene, ethylene, propylene, or butylene, optionally interrupted by a heteroatom.

In one embodiment, R is a substituted R and comprises an arylene, heteroarylene, and alkylene substituted with at least a spacer group that is bonded to A. In one embodiment, a substituted R comprises R'-Sp, wherein R' is selected from arylene, heteroarylene, and alkylene, as defined above, and Sp is a spacer selected from the functional groups listed above capable of bonding to both R' and A. In another embodiment, Sp is selected from —$CO_2$—, —$O_2C$—, —CO—, —$OSO_2$—, —$SO_3$—, —$SO_2$—, —$SO_2C_2H_4$O—, —$SO_2C_2H_4S$—, —$SO_2C_2H_4NR''$—, —O—, —S—, —NR''—, —NR''CO—, —CONR''—, —NR''$CO_2$—, —$O_2$CNR''—, —NR''CONR''—, —N(COR'')CO—, —CON(COR'')—, —NR''COCH($CH_2CO_2$R'')— and cyclic imides therefrom, —NR''COCH$_2$CH($CO_2$R'')— and cyclic imides therefrom, —CH($CH_2CO_2$R'')CONR''—, and cyclic imides therefrom, —CH($CO_2$R'')$CH_2$CONR'' and cyclic imides therefrom, (including phthalimide and maleimides of these), sulfonamide groups (including —$SO_2$NR''— and —NR''$SO_2$— groups), arylene groups, alkylene groups. R'', which can be the same or different, is defined as above, or represents hydrogen or an organic group such as a substituted or unsubstituted aryl or alkyl group, e.g., $C_5$-$C_{20}$ aryl groups, and substituted and unsubstituted $C_1$-$C_6$ alkyl groups. In one embodiment, Sp is selected from —$CO_2$—, —$O_2C$—, —O—, —NR''—, —NR''CO—, —CONR''—, —$SO_2$NR''—, 13 $SO_2CH_2CH_2$NR''—, —$SO_2CH_2CH_2$O—, or —$SO_2CH_2CH_2$S— wherein R'' is defined as above, e.g., selected from H and $C_1$-$C_6$ alkyl groups.

In another embodiment, Sp is derived from a compound having a reactive group selected from a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, salts or derivatives thereof, or any combination thereof. Examples of such compounds include amino-functionalized aromatic compounds, such as 4-aminobenzyl amine (4-ABA), 3-aminobenzyl amine (3-ABA), 2-aminobenzyl amine (2-ABA), 2-aminophenyl ethylamine, 4-aminophenyl-(2-sulfatoethyl)-sulphone, (APSES), p-aminobenzoic acid (PABA), 4-aminophthalic acid (4-APA), and 5-aminobenzene-1,2,3-tricarboxylic acid.

In one embodiment, the at least one organic group is capable of binding calcium (e.g., having defined calcium index values), including those organic groups described in PCT Pub. No. WO 2007/053564, the disclosure of which is incorporated herein by reference. For example, the organic group comprises at least one geminal bisphosphonic acid group, partial esters thereof, or salts thereof, e.g., a group having the formula —CQ($PO_3H_2$)$_2$, partial esters thereof, or salts thereof, wherein Q is bonded to the geminal position and may be H, R, OR, SR, or $NR_2$ wherein R, which can be the same or different, is defined as above, or can be H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. In addition, U.S. Pat. Nos. 5,672,198, 5,922,118, 6,042,643, and 6,641,656 disclose modified pigments having various attached groups, including phosphonic acid groups, the disclosures of which are incorporated herein by reference.

Other organic groups capable of binding calcium include: at least one hydroxamic acid group or salt thereof (e.g., at least one group having the formula —N(OH)—CO— or a salt thereof); at least one heteroaryl group having at least one OH group or salt thereof (e.g., a nitrogen-containing heteroaryl group, such as a pyridinyl group or a quinolinyl group, and the organic group is a hydroxy pyridinyl group or a hydroxy quinolinyl group, in which the hydroxy group is at a position on the heteroaryl group such that it is geometrically close to the heteroatom, such as ortho to the heteroatom; or a heteroaryl having two OH groups in positions ortho to each other); at least one phosphonic acid group or salt thereof and at least one second ionic, ionizable or basic group (a basic group is a Lewis base, such as an OH group or an amino group that can be geminal to the phosphonic acid group); at least one heteroaryl group having at least one carboxylic acid group or salt thereof (e.g., at least two or three carboxylic acid groups, such as at least two carboxylic acid groups that are ortho or meta to each other); an aryl group having at least one nitroso group and at least one OH group (e.g., ortho to each other), or a salt thereof; an azoarene group having at least two OH groups, at least two $NH_2$ groups, or at least one OH group and at least one $NH_2$ group (e.g., at least two OH groups, at least two $NH_2$ groups, or at least one OH group and at least one $NH_2$ group) and has the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group (e.g., the OH and/or $NH_2$ groups are located at positions ortho to the azo group). Other groups are disclosed in WO 2007/053564.

In one embodiment, the attached organic group comprises a polymer. In one embodiment, the polymer comprises at least one non-ionic group. Examples include alkylene oxide groups of from about 1 to about 12 carbons and polyols, such as a —$CH_2$—$CH_2$—O— group, a —CH($CH_3$)—$CH_2$—O— group, a —$CH_2$—CH($CH_3$)—O— group, a —$CH_2CH_2CH_2$—O— group, or combinations thereof. These non-ionic groups may further comprise at least one ionic or ionizable group as disclosed herein.

The attached polymers, which can be homopolymers or copolymers, can also be derived from monomers selected from acrylic and methacrylic acid, acrylate esters, methacrylate esters, acrylamides and methacrylamides, acrylonitriles, cyanoacrylate esters, maleate and fumarate diesters, vinyl pyridines, vinyl N-alkylpyrroles, vinyl acetate, vinyl oxazoles, vinyl thiazoles, vinyl pyrimidines, vinyl imidazoles, vinyl ketones, vinyl ethers, and styrenes. Vinyl ethers include those that can be prepared by cationic polymerization, such as those having the general structure $CH_2$=CH (OR), wherein R is an alkyl, aralkyl, alkaryl, or aryl group or is a group comprising one or more alkylene oxide groups. Vinyl ketones include those in which the β-carbon atom of the alkyl group does not bear a hydrogen atom, such as vinyl ketones in which both β-carbons bear a $C_1$-$C_4$ alkyl group, halogen, etc. or a vinyl phenyl ketone in which the phenyl group may be substituted with from 1 to 5 $C_1$-$C_6$ alkyl groups and/or halogen atoms. Styrenes include those in which the vinyl group is substituted with a $C_1$-$C_6$ alkyl group, such as at the α-carbon atom, and/or those in which the phenyl group is substituted with from 1 to 5 substituents including a $C_1$-$C_6$ alkyl, alkenyl (including vinyl), or alkynyl (including acetylenyl) group, a phenyl group, a haloalkyl group, and functional groups such as $C_1$-$C_6$ alkoxy, halogen, nitro, carboxy, sulfonate, $C_1$-$C_6$ alkoxycarbonyl, hydroxy (including those protected with a $C_1$-$C_6$ acyl group), and cyano groups. Specific examples include methyl acrylate (MA), methyl methacrylate (MMA), ethyl acrylate (EA), ethyl methacrylate (EMA), butyl acrylate (BA), 2-ethyl-hexyl acrylate (EHA), acrylonitrile (AN), methacrylonitrile, styrene, and derivatives thereof.

In one embodiment, the pigment (e.g., carbon black) is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643; 6,534,569; 6,398,858 and 6,494,943 (high shear conditions) 6,372,820; 6,368,239; 6,350,519; 6,337,358; 6,103,380; 7,173,078; 7,056,962; 6,942,724; 6,929,889; 6,911,073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like. In yet another embodiment, the at least one carbon black can be modified (e.g., to attach functional groups) by using the methods of U.S. Pat. Nos. 5,837,045, 6,660,075 and WO 2009/048564 (reaction with organic compounds containing a C—C double bond or triple bond activated by at least one substituent) or U.S. Pub. No. 2004/0171725, U.S. Pat. Nos. 6,664,312, 6,831,194 (reaction with anhydride component), U.S. Pat. No. 6,936,097, U.S. Pub. Nos. 2001/0036994, 2003/0101901 (reaction with organic groups having —N=N—N— group), Canadian Patent No. 2,351,162, European Patent No. 1 394 221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference.

Other methods to prepare modified pigments, including those having attached polymeric groups, have also been described in, for example, PCT Publication No. WO 01/51566, which discloses methods of making a modified pigment by reacting a first chemical group and a second chemical group to form a pigment having attached a third chemical group. PCT Pub. No. WO 2007/053563 discloses modified colorants having attached at least one polymeric group comprising a polymer having at least one functional group having defined calcium index values. Specific embodiments of the organic groups are described, including organic groups comprising at least one geminal bisphosphonic acid group, partial esters thereof, or salts thereof.

Other methods for the preparation of polymer modified pigment products have also been developed. For example, U.S. Pat. Nos. 7,056,962, 6,478,863, 6,432,194, 6,336,965, U.S. Pub. No. 2006/0189717, and PCT Pub. No. WO 2008/091653 the disclosures of which are incorporated herein by reference, describe methods for attaching polymers to pigments through the use of a diazonium salt. U.S. Pat. Nos. 7,173,078, 6,916,367, 6,911,073, 6,723,783, 6,699,319, 6,472,471, and 6,110,994, the disclosures of which are incorporated herein by reference, disclose methods of preparing a polymer modified pigment by reacting polymer and a pigment having an attached reactive group. Modified pigments having attached polymeric groups have also been disclosed in U.S. Pub. No. 2008/0177003, the disclosure of which is incorporated herein by reference, utilizes a polymer in the form of a melt.

The polymer modified pigments may also be prepared by polymerization of monomers from a pigment. For example, the polymer modified pigments may be prepared by radical polymerization, controlled polymerization methods, such as atom transfer radical polymerization (ATRP), stable free radical (SFR) polymerization, and reversible addition-fragmentation chain transfer polymerization (RAFT), ionic polymerizations (anionic or cationic) such as group transfer polymerization (GTP), and condensation polymerization. Also, the polymer modified pigments may be prepared using the methods described in, for example, U.S. Pat. Nos. 6,372,820; 6,350,519; 6,551,393; or 6,368,239 or in PCT Pub. Nos. 2006/086599 and 2006/086660, the disclosures of which are incorporated herein by reference. For modified pigments comprising the pigment coated by the polymer, these modified pigments can be prepared using any method known in the art, such as those described in U.S. Pat. Nos. 5,085,698, 5,998,501, 6,074,467, 6,852,777, and 7,074,843, and International Patent Publication Nos. WO 2004/111, 140, WO 2005/061087, and WO 2006/064193, the disclosures of which are incorporated herein by reference.

The surface grafting carbon black with polymers and prepolymers is described in N. Tsubokawa, in Prog. Polym. Sci., 17, 417, 1992, and J. Polym. Sci. Polym. Chem. Ed. Vol. 20, 1943-1946 (1982), the disclosures of which are incorporated herein by reference. Polymers having terminal hydroxyl or amino groups can be grafted onto surface carboxyl groups of the carbon black, as disclosed in N. Tsubokawa in Reactive & Functional Polymers 27 (1995) 75-81.

The modified pigments having attached at least one polymeric group may further comprise a second organic group, which is different from the polymeric groups described above. These include, for example, the groups described in U.S. Pat. No. 5,630,868, the disclosure of which is incorporated herein by reference. For example, the modified pigment may further comprise a second attached organic group that may comprise at least one ionic group, at least one ionizable group, or a mixture thereof. In one embodiment, the ionic or ionizable group is an anionic or anionizable group. Any of the ionic or ionizable groups, e.g., the anionic or anionizable groups, described above regarding the pigment of the modified pigment of the present invention may be the second organic group. Furthermore, the second organic group may be a polymeric group comprising a polymer. Any of the polymeric groups described above can also be used as the second attached organic group.

The amount of attached organic groups can be varied, depending on the desired use of the modified carbon black and the type of attached group. For example, the total amount of organic group may be from about 0.01 to about 10.0 micromoles of groups/m² surface area of pigment, as measured by nitrogen adsorption (BET method), including from about 0.5 to about 5.0 micromoles/m², from about 1 to about 3 micromoles/m², or from about 2 to about 2.5 micromoles/m². Additional attached organic groups, which differ from those described for the various embodiments of the present invention, may also be present.

In one embodiment, the self-dispersed pigment is an oxidized carbon black, e.g., having an oxygen content greater than or equal to 3%, which can be determined by methods known in the art (e.g., elemental analysis).

In one embodiment, oxidized blacks feature a surface having ionic or ionizable, oxygen-containing groups such as one or more of phenols, lactones, carbonyls, carboxyls (e.g., carboxylic acids), anhydrides, ethers, and quinones. The extent of oxidation of carbon black can determine the surface concentration of such ionic or ionizable groups. The carbon blacks disclosed herein can be oxidized by a variety of oxidizing agents known in the art. Exemplary oxidizing agents for carbon blacks include oxygen gas, ozone, $NO_2$ (including mixtures of $NO_2$ and air), peroxides such as hydrogen peroxide, persulfates such as sodium, potassium, and ammonium persulfate, hypohalites such as sodium hypochlorite, halites, halates, or perhalates (such as sodium chlorite, sodium chlorate, or sodium perchlorate), oxidizing acids such as nitric acid, and transition metal-containing oxidants such as permanganate salts, osmium tetroxide, chromium oxides, ceric ammonium nitrates, and mixtures thereof, e.g., mixtures of gaseous oxidants such as oxygen and ozone. In one embodiment, the carbon blacks disclosed herein are oxidized via ozone oxidation, e.g., as described in U.S. Pat. Nos. 7,922,805 and 9,056,994, the disclosures of which are incorporated herein by reference.

The inkjet ink composition can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides and fungicides, pH control agents, drying accelerators, penetrants, and the like. The amount of additive will vary depending on a variety of factors but are generally present in an amount ranging from 0% and 40%, e.g., from 0.1% to 40%, based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts. Additional details on dispersions and the inkjet ink compositions are provided below.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be used neat or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, e.g., copolymers of silicone, ethyleneoxide and/or propyleneoxide, acrylic acid copolymers, polyoxyethylene alkyl ether, polyoxyethylene alkylphenyl ether, polyoxyethylene secondary alcohol ether, polyoxyethylene styrol ether, acetylenic diols such as ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth) acrylic acid, acrylic acid-(meth)acrylonitrile copolymers, potassium (meth)acrylate-(meth)acrylonitrile copolymers, vinyl acetate-(meth)acrylate ester copolymers and (meth) acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

In one embodiment, the pigment is a polymer-dispersed pigment comprising at least one polymer adsorbed to or encapsulating the pigment (e.g., a polymer-encapsulated pigment). In one embodiment, polymer-encapsulated pigments comprise polymer-dispersed pigments in which the polymer is crosslinked with various crosslinking agents. Polymer-dispersed pigments can comprise natural polymer or a synthetic polymer dispersants as described herein. The pigment can be any pigment described herein, e.g., a non-modified, or otherwise untreated pigment, or a modified (self-dispersed) pigment. In one embodiment, the polymer is present in an amount ranging from 0.1% to 20% by weight, e.g., from 0.2% to 20% by weight, or from 0.5% to 20% by weight relative to the total weight of the inkjet ink composition.

In one embodiment, the inkjet ink composition has a viscosity ranging from 1-25 cP. The viscosity can be adjusted by varying the amount of the at least one polyurethane. Alternatively, or in addition, the viscosity of an inkjet ink composition can be adjusted with various rheological additives including, but are not limited to, alkali swellable emulsions (such as Rheovis® AS rheology-control additive from BASF), hydrophobically modified alkali swellable emulsions (such as Rheovis® HS rheology-control additive from BASF), and hydrophobically modified polyethers (such as Rheovis® PE rheology-control additive from BASF).

Humectants and water soluble organic compounds may also be added to the inkjet ink composition of the present invention, e.g., for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

In one embodiment, the inkjet ink composition comprises a cosolvent. In one embodiment, the cosolvent is soluble or miscible in water at concentrations of at least 10% by weight and is also chemically stable to aqueous hydrolysis conditions (e.g., reaction with water under heat aging conditions, including, for example, the hydrolysis of esters and lactones). In one embodiment, the cosolvent has a dielectric constant below that of water, such as a dielectric constant ranging from about 10 to about 78 at 20° C. Examples of suitable cosolvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-pentanediol, 2,6-hexanediol, neopentylglycol (2,2-dimethyl-1,3-propanediol), 1,3-propanediol, 1,4-butanediol, 1,5-pentanediol, 1,6- hexanediol, 1,2,6-hexanetriol, and poly(ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ε-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). These cosolvents may be used alone or in combination.

The amount of the cosolvent can be varied depending on a variety of factors, including the properties of the cosolvent (solubility and/or dielectric constant), the type of modified pigment, and the desired performance of the resulting inkjet ink composition. The optional cosolvent may be used in amounts of less than or equal to about 40% by weight based on the total weight of the inkjet ink composition, including less than or equal to about 30% and less than or equal to about 20%. Also, when used, the amount of the optional cosolvent is greater than or equal to about 1% or 2% by weight based on the total weight of the inkjet ink composition, including greater than or equal to about 5% and greater than or equal to about 10% by weight.

Additives for controlling or regulating the pH of the inkjet ink composition (pH control agents) may also be used. Examples of suitable pH regulators include various amines such as diethanolamine and triethanolamine as well as various hydroxide reagents. An hydroxide reagent is any reagent that comprises an OH— ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH— ions in an aqueous medium. Examples include carbonates such as sodium carbonate, bicarbonates such as sodium bicarbonate, and alkoxides such as sodium methoxide and sodium ethoxide. Buffers may also be added.

In general, inkjet ink printing involves ejecting or propelling small ink droplets from a cartridge through nozzles onto a substrate. The droplet can be less than 50 picoliters, from 10-20 picoliters or from 20-40 in size. Various methods for jetting the droplets have been developed. For example, thermal inkjet printing involves running a pulse of current through small electrically heated elements causing a steam explosion in the chamber that forms a bubble, which propels a droplet of ink onto the paper. Alternatively, ink may be jetted using a piezoelectric material instead of a heating element. The piezomaterial changes shape or size, which generates a pressure pulse in the ink, forcing a droplet of ink out from the nozzle. Due to these differing methods, the requirements for the ink compositions may also differ. For example, the thermal inkjet printing process can cause thermal formation of coatings on the heating element (kogation), which can result in poor firing of the nozzles and poor print quality. In one embodiment, the inkjet ink compositions described herein can be used as either piezo inkjet ink compositions or thermal inkjet ink compositions despite the differences in requirements. In one embodiment, the inkjet ink compositions described herein are thermal inkjet ink compositions.

Also disclosed herein are inkjet ink compositions comprising at least one pigment and at least one polyurethane, wherein the at least one pigment is a self-dispersed pigment e.g., a modified pigment having attached at least one organic group or an oxidized carbon black. The at least one polyurethane can comprise at least one polypropylene glycol (such as polypropylene glycols having a number average molecular weight ranging from 400 g/mol to 6000 g/mol, or other ranges disclosed herein), and at least one diisocyanate (e.g., toluene diisocyanates such as toluene 2,4-diisocyanate and toluene 2,6-diisocyanate, isophorone diisocyanate, and combinations thereof). In one embodiment the at least one polyurethane has an NCO/OH ratio ranging from 0.85 to 1.15 or ranging from 0.9 to 1.1. The polyurethane can further comprise a monomer containing at least one hydrophilic group (e.g., carboxylic acid, salts, and esters thereof), such as DMPA. In one embodiment, the polyurethane consists essentially of, or consists of, at least one polypropylene glycol, at least one diisocyanate (e.g., toluene diisocyanates such as toluene 2,4-diisocyanate and toluene 2,6-diisocyanate, isophorone diisocyanate, and combinations thereof), and a monomer containing at least one hydrophilic group (e.g., carboxylic acid, salts, and esters thereof), such as DMPA.

EXAMPLES

Abbreviations:
TDI=toluene diisocyanate
TMXDI=tetramethylxylene diisocyanate
IPDI=isophorone diisocyanate
DMPA=dimethylolpropionic acid
PPG=polypropylene glycol
PPG-1000=polypropylene glycol with a hydroxyl number of about 112 mg KOH/g (Arcol® PPG-1000 polyether polyol, from Bayer MaterialScience LLC)
PPG-2000=polypropylene glycol with a hydroxyl number of about 56 mg KOH/g (Arcol® PPG-2000 polyether polyol from Bayer MaterialScience LLC)
PPG-3025=polypropylene glycol with a hydroxyl number of about 37 mg KOH/g (Arcol® PPG-3025 polyether polyol from Bayer MaterialScience LLC)
DBTL=dibutyltin dilaurate
TEA=triethylamine
THF=tetrahydrofuran
BYK-348=BYK® 348 silicone surfactants from BYK Additives & Instruments
COJ400=CAB-O-JET® 400 pigment dispersion, a black aqueous pigment dispersion from Cabot Corporation.

Preparation and Properties of Polyurethanes PU-A to PU-G

Several polyurethanes (PU-A to PU-G) were incorporated in inkjet ink compositions, which were tested for printing performance. Polyurethane PU-A is commercially available as NeoRez® R-551 urethane dispersion from DSM Neo-Resins. Additionally, several polyurethane samples were prepared as described below. The monomers used and properties of these polyurethanes are listed in Table 1.

TABLE 1

| PU Examples | PU-A | PU-B | PU-C | PU-D | PU-E | PU-F | PU-G |
| --- | --- | --- | --- | --- | --- | --- | --- |
| co-monomer I | TMXDI | TDI | TDI | TDI | TDI | TDI | TDI |
| co-monomer II | DMPA | DMPA | DMPA | DMPA | DMPA | DMPA | DMPA |
| MW of PPG | 550 | 1000 | 2000 | 3000 | 2000 | 3000 | 2000 |
| NCO/OH ratio | 1.18 | 1.6 | 1.33 | 1.06 | 1.33 | 1.6 | 1.06 |
| Acid Number | 14 | 16 | 40 | 16 | 40 | 64 | 32 |
| Solubility in THF | No | Yes | Yes | Yes | Yes | No | Yes |
| Mw (g/mole) | n/a | 137,300 | 124,000 | 77,000 | 116,500 | n/a | 69,000 |
| wt % of PPG | 59% | 69% | 66% | 86% | 66% | 48% | 75% | n/a = not available;
NCO/OH ratio: molar amount of isocyanate groups/molar amount of hydroxyl groups from all diol monomers.

Solubility Test for Polyurethanes

The solubility of polyurethane samples in THF was conducted by adding approximately 0.5 g of dry polymer into 20 mL of THF (including 0.06 mL trifluoroacetic acid to improve solubility) and allowing the mixture sit at RT for 24 h, followed by separation of clear liquid from any residual insoluble solid or swelled gel-like polymer. The mass of insoluble polymer relative to the initial polymer amount can be defined as gel fraction. Polymers that are soluble in THF are defined as those having a gel fraction below 5%. For PU-A, its gel fraction was approximately 90%.

Determination of the Molecular Weight of Polyurethane

The molecular weights of the polyurethane in the Examples were measured by a size exclusion chromatography. A polyurethane was first dissolved in a solvent mixture containing water, trifluoroacetic acid, and tetrahydrofuran. The polyurethane solution was then injected into a PLgel Mixed-D column. The mobile phase was 0.1 vol % of trifluoroacetic acid in tetrahydrofuran. The weight-average molecular weight of polyurethane and its molecular weight distribution were determined from the comparison of the resulting data with polystyrene standards with known molecular weights.

Determination of the Acid Number of Polyurethanes

The acid number (AN) of polyurethanes was calculated by using the amounts of polypropylene glycol (PPG) and co-monomers I and II based on the following equation:

AN=(no. mol of co-monomer II×56.1 mgKOH× 1000)/(the total mass (g) of PPG+co-monomer I+co-monomer II)

Determination of Wt % of PPG

The wt % of polypropylene glycol of the polyurethane was calculated by using the amounts of polypropylene glycol (PPG), and co-monomers I and II based on the following equation:

Wt % of PPG=(weight of PPG)/(the total mass (g) of PPG+co-monomer I+co-monomer II)×100%

Preparation of Polyurethane PU-B

Preparation of NCO-terminated Prepolymer B: To a 1 liter cylindrical reactor equipped with a temperature monitor, a stirrer, a condenser, and a nitrogen gas line, were added 155 g of PPG-1000, 8.6 g of DMPA, and 17.2 g of NMP N-methyl-2-pyrrolidone. After the content was heated to 100° C. under fast nitrogen flow, high vacuum was applied. The clear, well mixed solution thus obtained was back flushed with nitrogen and then cooled to about 50-60° C. 61 g of TDI was then added to the mixture dropwise via an addition funnel or a plastic syringe, while the temperature was well controlled to remain below about 80° C. The reaction temperature was then raised to about 95° C. and held for 1.5 hours. After the temperature was cooled to about 60-70° C., 405 mL of anhydrous acetone was added slowly under stirring. A prepolymer acetone solution was obtained and kept at about 40° C. under nitrogen. The NCO % was determined by titration to be 4.720. 5.9 mL of TEA was then added to this batch of NCO-terminated prepolymer acetone solution, followed by stirring for about 30 minute at about 40° C. under nitrogen. The solution thus obtained was divided for the next step.

Preparation of Polyurethane PU-B: Under stirring, about 100 g of the warm NCO-terminated prepolymer acetone solution obtained above was added quickly via a syringe or an addition funnel at room temperature to an aqueous solution containing about 180 g of deionized water and 0.56 mL of TEA. The reaction mixture was kept stirring overnight, and then acetone was removed under vacuum. A final polyurethane solution was obtained: 17.1% solid, and pH 8.20.

Preparation of Polyurethane PU-C

Preparation of NCO-terminated Prepolymer C: To a 1 liter cylindrical reactor equipped with a temperature monitor, a stirrer, a condenser, and a nitrogen gas line, were added 143.2 g of PPG-2000, 20.7 g of DMPA, and 41.4 g of NMP. After the content was heated to 100° C. under fast nitrogen flow, high vacuum was applied. The clear, well mixed solution thus obtained was back flushed with nitrogen and then cooled to about 50-60° C. 52.3 g of TDI was then added to the mixture dropwise via an addition funnel or a plastic syringe, while the temperature was well controlled to remain below about 80° C. The reaction temperature was then raised to about 95° C. and held for 1.5 hours. After the temperature was cooled to about 60-70° C., 360 mL of anhydrous acetone was added slowly under stirring. A prepolymer acetone solution was obtained and kept at about 40° C. under nitrogen. The NCO % was determined by titration to be 2.790. 14.2 mL of TEA was then added to this batch of NCO-terminated prepolymer acetone solution, followed by stirring for about 30 minute at about 40° C. under nitrogen. The solution thus obtained was divided for the next step.

Preparation of Polyurethane PU-C: Under stirring, about 100 g of the warm NCO-terminated prepolymer acetone solution obtained above was added quickly via a syringe or an addition funnel at room temperature to an aqueous solution containing about 180 g of deionized water and 1.4 mL of TEA. The reaction mixture was kept stirring overnight, and then acetone was removed under vacuum. A final polyurethane solution was obtained: 24.8% solid, and pH 7.62.

Preparation of Polyurethane PU-D

Preparation of NCO-terminated Prepolymer D: To a 1 liter cylindrical reactor equipped with a temperature monitor, a stirrer, a condenser, and a nitrogen gas line, were added 212.7 g of PPG-3025, 9.5 g of DMPA, and 19.0 g of NMP. After the content was heated to 100° C. under fast nitrogen flow, high vacuum was applied. The clear, well mixed solution thus obtained was back flushed with nitrogen and then cooled to about 50-60° C. 26.1 g of TDI was then added to the mixture dropwise via an addition funnel or a plastic syringe, while the temperature was well controlled to remain below about 80° C. The reaction temperature was then raised to about 95° C. and held for 3 hours. After the temperature was cooled to about 60-70° C., 450 mL of anhydrous acetone was added slowly under stirring. A prepolymer acetone solution was obtained and kept at about 40° C. under nitrogen. The NCO % was determined by titration to be 0.542. 6.5 mL of TEA was then added to this batch of NCO-terminated prepolymer acetone solution, followed by stirring for about 30 minute at about 40° C. under nitrogen. The solution thus obtained was divided for the next step.

Preparation of Polyurethane PU-D: Under stirring, about 100 g of the warm NCO-terminated prepolymer acetone solution obtained above was added quickly via a syringe or an addition funnel at room temperature to an aqueous solution containing about 180 g of deionized water and 0.56 mL of TEA. The reaction mixture was kept stirring overnight, and then acetone was removed under vacuum. A final polyurethane solution was obtained: 20.1% solid, and pH 7.49.

Preparation of Polyurethane PU-E

Preparation of NCO-terminated Prepolymer E: To a 1 liter cylindrical reactor equipped with a temperature monitor, a stirrer, a condenser, and a nitrogen gas line, were added 143.2 g of PPG-2000, 20.7 g of DMPA, and 41.4 g of NMP. After the content was heated to 100° C. under fast nitrogen flow, high vacuum was applied. The clear, well mixed solution thus obtained was back flushed with nitrogen and then cooled to about 50-60° C. 52.3 g of TDI was then added to the mixture dropwise via an addition funnel or a plastic syringe, while the temperature was well controlled to remain below about 80° C. The reaction temperature was then raised to about 95° C. and held for 1.5 hours. After the temperature was cooled to about 60-70° C., 360 mL of anhydrous acetone was added slowly under stirring. A prepolymer acetone solution was obtained and kept at about 40° C. under nitrogen. The NCO % was determined by titration to be 2.707. 14.2 mL of TEA was then added to this batch of NCO-terminated prepolymer acetone solution, followed by stirring for about 30 minute at about 40° C. under nitrogen. The solution thus obtained was divided for the next step.

Preparation of Polyurethane PU-E: Under stirring, about 100 g of the warm NCO-terminated prepolymer acetone solution obtained above was added quickly via a syringe or an addition funnel at room temperature to an aqueous solution containing about 180 g of deionized water and 1.4 mL of TEA. The reaction mixture was kept stirring overnight, and then acetone was removed under vacuum. A final polyurethane solution was obtained: 20.1% solid, and pH 8.28.

Preparation of Polyurethane PU-F

Preparation of NCO-terminated Prepolymer F: To a 1 liter cylindrical reactor equipped with a temperature monitor, a stirrer, a condenser, and a nitrogen gas line, were added 116.3 g of Arcol PPG-3025, 36.7 g of DMPA, and 73.5 g of NMP. After the content was heated to 100° C. under fast nitrogen flow, high vacuum was applied. The clear, well mixed solution thus obtained was back flushed with nitrogen and then cooled to about 50-60° C. 87.1 g of TDI was then added to the mixture dropwise via an addition funnel or a plastic syringe, while the temperature was well controlled to remain below about 80° C. The reaction temperature was then raised to about 95° C. and held for 1.5 hours. After the temperature was cooled to about 60-70° C., 370 mL of anhydrous acetone was added slowly under stirring. A prepolymer acetone solution was obtained and kept at about 40° C. under nitrogen. The NCO % was determined by titration to be 6.166. 25.2 mL of TEA was then added to this batch of NCO-terminated prepolymer acetone solution, followed by stirring for about 30 minute at about 40° C. under nitrogen. The solution thus obtained was divided for the next step.

Preparation of Polyurethane PU-F: Under stirring, about 100 g of the warm NCO-terminated prepolymer acetone solution obtained above was added quickly via a syringe or an addition funnel at room temperature to an aqueous solution containing about 180 g of deionized water and 2.24 mL of TEA. The reaction mixture was kept stirring overnight, and then acetone was removed under vacuum. A final polyurethane solution was obtained: 19.8% solid, and pH 8.31.

Preparation of Polyurethane PU-G

Preparation of NCO-terminated Prepolymer G: To a 1 liter cylindrical reactor equipped with a temperature monitor, a stirrer, a condenser, and a nitrogen gas line, were added 212 g of PPG-2000, 21 g of DMPA, and 42 g of NMP. After the content was heated to 100° C. under fast nitrogen flow, high vacuum was applied. The clear, well mixed solution thus obtained was back flushed with nitrogen and then cooled to about 50-60° C. 41.8 g of TDI was then added to the mixture dropwise via an addition funnel or a plastic syringe, while the temperature was well controlled to remain below about 80° C. The reaction temperature was then raised to about 80° C. and held for 3.5 hours. After the temperature was cooled to about 60-70° C., 468 mL of anhydrous acetone was added slowly under stirring. A prepolymer acetone solution was obtained and kept at about 40° C. under nitrogen. The NCO % was determined by titration to be 0.936. 14.4 mL of TEA was then added to this batch of NCO-terminated prepolymer acetone solution, followed by stirring for about 30 minute at about 40° C. under nitrogen. The solution thus obtained was divided for the next step.

Preparation of Polyurethane PU-G: Under stirring, about 100 g of the warm NCO-terminated prepolymer acetone solution obtained above was added quickly via a syringe or an addition funnel at room temperature to an aqueous solution containing about 180 g of deionized water and 1.12 mL of TEA. The reaction mixture was kept stirring overnight, and then acetone was removed under vacuum. A final polyurethane solution was obtained: 14.2% solid, and pH 7.41.

Ink Compositions

Inks were prepared according to the formulations of Table 2. For each ink, CAB-O-JET® 400 pigment dispersions ("COJ400") from Cabot Corporation were used. The amounts listed are in weight percent of the final ink composition. The pigment dispersions and polyurethanes are quoted on a solids basis.

TABLE 2

| Component | Amount (wt %) |
|---|---|
| COJ400 | 4% |
| polyurethane | 1% |
| glycerol | 2% |
| ethylene glycol | 2% |
| 1,2-hexanediol | 3% |
| triethylene glycol monobutyl ether | 5% |
| 2-pyrrolidone | 3% |
| triethanolamine | 0.5% |
| BYK-348 | 0.5% |
| water | Balance |

The inkjet ink compositions were printed on with a Canon iP4000 thermal inkjet printer. Each inkjet ink composition was loaded into a Canon compatible cartridge (available from Inkjet Warehouse) and printed with the following printer settings: print quality: high; plain paper; grey scale; and no photo options selected. Images were printed on Hewlett-Packard multi-purpose printing paper (HPMP). Print properties of the resulting printed images were measured at various times after printing (e.g., 24 hours).

The optical density (OD) of the printed images was measured by using either a SpectroEye™ Gretag or X-rite 938 spectrophotometers. For both instruments, the following settings were used: Illumination at D65, 2 degree Standard Observer, DIN density standard, white base set to Abs, and no filter. Results were reported as an average of OD values on these two papers. For each paper, OD value was reported as an average of at least three optical density measurements taken at two corners, and the middle of a page.

Smear resistance (i.e., smear-fastness) was measured with a highlight smear test (also referred to as the durability test) by using a yellow Sharpie® ACCENT® Yellow Highlighters #25025 as follows. A single pass or double pass (two swipes, one on top of the other) of the highlighter on a non-printed portion of the paper was performed to establish a reference value. Another single or double pass was then made across four 2-mm wide stripes printed 3 mm apart. The optical density (OD) value adjacent to the printed area for each swipe of the highlighter was measured with the SpectroEye™ spectrophotometer, along with the reference OD value. The difference between the reference OD value and the measured OD value adjacent to the printed area (ΔOD) was the smear-fastness value. Usually, ΔOD values were recorded for tests from a double pass at 24 hours after printing.

The jetting performance for each inkjet ink composition was evaluated by two different tests.

Jetting Test I: Each inkjet ink composition was printed using a Canon iP4000 thermal inkjet printer to generate 10 pages of solid (i.e., 100% ink coverage) black blocks (size: 6.5 inch×9.5 inch) with the following printer settings: print quality: normal; plain paper; grey scale; and no photo options selected. Images were printed on HPMP paper. These 10 pages of solid black prints were evaluated as:

Good=No or little defects;
Fair=some missing lines on >50% of the 10 pages;
Poor=Many missing lines on >50% of the 10 pages, or unable to print Jetting Test II: For each inkjet ink composition, a drop weight test was also performed on an HP45 thermal inkjet cartridge, which was filled with the inkjet ink composition. A computer was used to control the selection of firing nozzles and the firing electrical parameters. The ink drops were collected and weighed. The average drop weight (ng) was obtained by firing each ink for about 10-50 million drops in the same conditions. The drop weight test results were evaluated as:

Good=the average drop weight was above 30 ng;
Fair=the average drop weight was between 25 and 30 ng; and
Poor=the average drop weight was below 25 ng.

Both jetting test results and smear test results of these ink compositions are summarized in Table 3.

TABLE 3

| Inks | PU | Jetting Test I | Jetting Test II (ng) | OD on HPMP | ΔOD at 24 h |
|---|---|---|---|---|---|
| Ex I | PU-A | Poor | Poor | n/a | n/a |
| Ex II | PU-B | Fair | Poor | 1.46 | 0.08 |
| Ex III | PU-C | Poor | Poor | n/a | n/a |
| Ex IV | PU-D | Fair | Fair | 1.55 | 0.06 |
| Ex V | PU-E | Poor | Poor | n/a | n/a |
| Ex VI | PU-F | Poor | n/a | n/a | n/a |
| Ex VII | PU-G | Good | Good | 1.55 | 0.01 |
| Comp I | None | Good | Good | 1.63 | 0.35 |

Jetting test results in Table 3 indicated that the wt % of polypropylene glycol in PU had a significant effect. When the wt % of polypropylene glycol was ≥70%, as in Ex IV and Ex VII, the resulting ink compositions showed fair or good jetting performance based on both test methods, similar to Comp I, which contained no polyurethane. As a comparison, all other examples showed poor overall jetting performance, where the jetting performance was ranked as poor jetting based on Test I or Test II or both. Moreover, Ex IV and Ex VII inks exhibited much improved smear resistance performance over the non-polyurethane containing ink (Comp I). These results indicate that inks containing polypropylene glycol-based polyurethanes having a ≥70 wt % of polypropylene glycol in PU (Ex IV and VII) provide improved print performance.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An inkjet ink composition comprising:
   at least one pigment; and
   at least one polyurethane comprising:
      at least one polypropylene glycol, and
      at least one diisocyanate,
   wherein the at least one polyurethane contains polypropylene glycol in an amount ranging from 72% to 90% by weight relative to the at least one polyurethane, and wherein the at least one polyurethane has a weight average molecular weight ($M_w$) ranging from 50,000 to 80,000.

2. The composition of claim 1, wherein the number average molecular weight of the at least one polypropylene glycol ranges from 400 g/mol to 6,000 g/mol.

3. The composition of claim 1, wherein the number average molecular weight of the at least one polypropylene glycol ranges from 1000 g/mol to 4,000 g/mol.

4. The composition of claim 1, wherein the at least one diisocyanate has the formula (I):

$$OCN-R_1-NCO \qquad (I)$$

wherein $R_1$ is substituted or unsubstituted and is selected from $C_1$-$C_{10}$ alkylene, $C_3$-$C_{20}$ cycloalkylene, $C_3$-$C_{20}$ heterocycloalkylene, $C_5$-$C_{20}$ arylene, $C_3$-$C_{20}$ heteroarylene, and combinations thereof.

5. The composition of claim 4, wherein $R_1$ is substituted with at least one substituent selected from $C_1$-$C_{10}$ alkyl and $C_5$-$C_{20}$ aryl groups.

6. The composition of claim 1, wherein the at least one diisocyanate is selected from toluene 2,4-diisocyanate, toluene 2,6-diisocyanate, hexamethylene diisocyanate, 4,4'-methylene diphenyl diisocyanate, 2,4'-methylene diphenyl diisocyanate, 2,2'-methylene diphenyl diisocyanate, methylene bis(4-cyclohexyl diisocyanate), m-tetramethylxylene diisocyanate, and isophorone diisocyanate.

7. The composition of claim 1, wherein the at least one diisocyanate is present in an amount ranging from 3% to 25% by weight, relative to the at least one polyurethane.

8. The composition of claim 1, wherein the at least one polyurethane further comprises at least one monomer containing at least one hydrophilic group.

9. The composition of claim 8, wherein the at least one hydrophilic group is selected from hydroxyls, carboxylic acids, sulfonic acids, phosphonic acids, polyethers, and salts and ethers thereof.

10. The composition of claim 8, wherein the at least one hydrophilic group is selected from carboxylic acids, and salts and ethers thereof.

11. The composition of claim 8, wherein the monomer containing the at least one hydrophilic group is dimethylolpropionic acid.

12. The composition of claim 8, wherein the monomer containing at least one hydrophilic group has the formula (II):

$$-O-R_2-O- \qquad (II)$$

wherein $R_2$ comprises the at least one hydrophilic group bonded to a moiety, which is substituted or unsubstituted, wherein the moiety is selected from $C_1$-$C_{10}$ alkylene, $C_3$-$C_{20}$ cycloalkylene, $C_3$-$C_{20}$ heterocycloalkylene, $C_5$-$C_{20}$ arylene, $C_3$-$C_{20}$ heteroarylene, $C_6$-$C_{20}$ alkylarylene.

13. The composition of claim 12, wherein the moiety is substituted with at least one substituent selected from $C_1$-$C_{10}$ alkyl and $C_5$-$C_{20}$ aryl groups.

14. The composition of claim 1, wherein the at least one polyurethane has an NCO/OH ratio ranging from 0.85 to 1.15.

15. The composition of claim 1, wherein the at least one polyurethane has an NCO/OH ratio ranging from 0.9 to 1.1.

16. The composition of claim 1, wherein the at least one polyurethane has an acid number ranging from 10 to 50 mg KOH/g polyurethane.

17. The composition of claim 1, wherein the at least one polyurethane has an acid number ranging from 15 to 35 mg KOH/g polyurethane.

18. The composition of claim 1, wherein the at least one polyurethane is present in the composition in an amount ranging from 0.1% to 15% by weight, relative to the total weight of the composition.

19. The composition of claim 1, wherein the at least one polyurethane is present in the composition in an amount ranging from 0.1% to 10% by weight, relative to the total weight of the composition.

20. The composition of claim 1, wherein the at least one polyurethane is present in the composition in an amount ranging from 0.1% to 1.5% by weight, relative to the total weight of the composition.

21. The composition of claim 1, wherein the pigment is a self-dispersed pigment.

22. The composition of claim 1, wherein the pigment is a self-dispersed pigment having attached at least one organic group.

23. The composition of claim 22, wherein the at least one attached organic group comprises a group selected from carboxylic acids, sulfonic acids, phosphonic acids, hydroxyls, amines, and esters, amides, and salts thereof.

24. The composition of claim 22, wherein the at least one attached organic group comprises phosphonic acids.

25. The composition of claim 22, wherein the at least one attached organic group comprises at least one geminal bisphosphonic acid group.

26. The composition of claim 21, wherein the self-dispersed pigment comprises an oxidized carbon black.

27. The composition of claim 1, wherein the pigment is a polymer-dispersed pigment.

28. The composition of claim 1, wherein the pigment is a polymer-encapsulated pigment.

29. The composition of claim 1, wherein the composition is a thermal inkjet ink composition.

30. The composition of claim 1, wherein the at least one polyurethane contains polypropylene glycol in an amount ranging from 74% to 90% by weight, relative to the at least one polyurethane.

* * * * *